United States Patent
Horn

(10) Patent No.: US 10,810,382 B2
(45) Date of Patent: Oct. 20, 2020

(54) AUTOMATED CONVERSION OF VOCABULARY AND NARRATIVE TONE

(71) Applicant: Disney Enterprises, Inc., Burbank, CA (US)

(72) Inventor: David Horn, San Francisco, CA (US)

(73) Assignee: Disney Enterprises, Inc., Burbank, CA (US)

(*) Notice: Subject to any disclaimer, the term of this patent is extended or adjusted under 35 U.S.C. 154(b) by 116 days.

(21) Appl. No.: 16/155,181

(22) Filed: Oct. 9, 2018

(65) Prior Publication Data

US 2020/0110807 A1 Apr. 9, 2020

(51) Int. Cl.
*G06F 40/58* (2020.01)
*G06N 3/08* (2006.01)
*G10L 25/63* (2013.01)

(52) U.S. Cl.
CPC ............... *G06F 40/58* (2020.01); *G06N 3/08* (2013.01); *G10L 25/63* (2013.01)

(58) Field of Classification Search
CPC ................................. G10L 25/63; G06F 40/58
See application file for complete search history.

(56) References Cited

U.S. PATENT DOCUMENTS

| 2017/0083492 A1* | 3/2017 | Chang ................... G09B 29/00 |
| 2018/0293228 A1* | 10/2018 | Tarakji ................. G06F 40/263 |
| 2019/0034416 A1* | 1/2019 | Al Hasan ............. G06N 3/0445 |

FOREIGN PATENT DOCUMENTS

| JP | 5020075 B2 * | 9/2012 | ........... G06F 40/166 |
| WO | WO-2017104875 A1 * | 6/2017 | ............. G10L 25/60 |

OTHER PUBLICATIONS

Google Translate. Google, Google, https://translate.google.com/. pp. 1.

* cited by examiner

*Primary Examiner* — Feng-Tzer Tzeng
(74) *Attorney, Agent, or Firm* — Farjami & Farjami LLP

(57) ABSTRACT

There is provided a content translation system includes a computing platform having a hardware processor and a system memory storing a language conversion software code including a vocabulary conversion convolutional neural network (CNN). The hardware processor is configured to execute the language conversion software code to obtain a content including a language-based content expressed in a first vocabulary. The hardware processor also executes the language conversion software code to convert a wording of the language-based content from the first vocabulary to a second vocabulary using the vocabulary conversion CNN, where the first vocabulary and the second vocabulary are in the same language. The hardware processor further executes the language conversion software code to output a translated content corresponding to the content for rendering on a display, the translated content including the language-based content expressed in the second vocabulary.

19 Claims, 4 Drawing Sheets

AUTOMATED CONVERSION OF VOCABULARY AND NARRATIVE TONE

BACKGROUND

Teens and children may often be curious about subjects that also interest adults, such as science, entertainment, sports, and news about events in the adult world. Although content aggregation services offering newsfeeds including topical information content or content known to be of specific interest to a subscriber exist, those services typically provide content that is developed for adult audiences. As a result, teens and children seeking to learn about or better understand the world around them may find the content provided by conventional content aggregation services to be at too high a reading level to be enjoyable, or to include language that is unsuitable for them. Moreover, much of the news content and commentary generated for adults is uninteresting to a young audience in tone, and may undesirably discourage further inquiry by a young audience.

SUMMARY

There are provided systems and methods for performing automated conversion of vocabulary and narrative tone, substantially as shown in and/or described in connection with at least one of the figures, and as set forth more completely in the claims.

DETAILED DESCRIPTION

Figure 1:
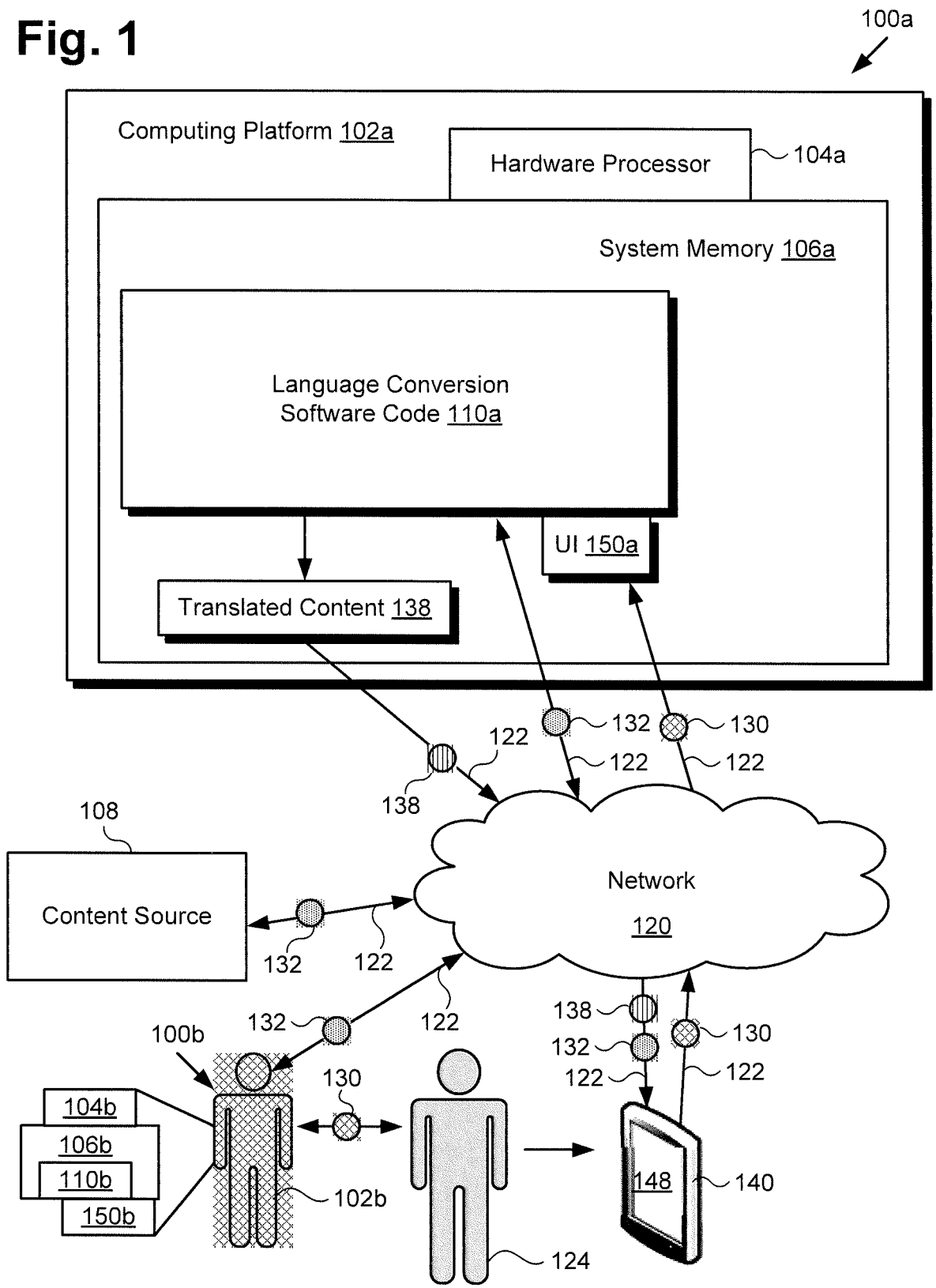
FIG. 1 shows a diagram of exemplary systems for performing automated conversion of vocabulary and narrative tone, according to exemplary implementations.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application is directed systems and methods for performing automated conversion of vocabulary and/or narrative tone that addresses and overcomes the deficiencies in the conventional art. In some implementations, the automated solutions disclosed in the present application utilize a language conversion software code including a vocabulary conversion convolutional neural network (CNN) to convert the wording of language-based content expressed in a first vocabulary to a second vocabulary, where the first vocabulary and the second vocabulary are in the same language.

For example, the automated solutions described in the present application may convert language-based content expressed using a vocabulary suitable for an adult audience to a vocabulary including fewer and/or simpler words that are better suited to an audience of teens or children. In addition, or alternatively, in some implementations, the language conversion software code utilized by the present automated solution may include a tone transformation CNN for transforming a narrative tone of language-based content intended for an adult audience to a narrative tone that is more optimistic and/or encouraging for a younger audience.

It is noted that, as used in the present application, the terms "automation," "automated", and "automating" refer to systems and processes that do not require human intervention. Although, in some implementations, a human editor may review or even modify vocabulary converted by the automated systems and according to the automated methods described herein, that human involvement is optional. Thus, the methods described in the present application may be performed under the control of hardware processing components of the disclosed systems.

It is further noted that, as defined in the present application, a convolutional neural network, or CNN, is a deep artificial neural network including layers that apply a convolution operation to an input to the CNN. Such a CNN is a machine learning engine designed to progressively improve its performance of a specific task. In various implementations, CNNs may be utilized to perform image processing or natural-language processing.

FIG. 1 shows a diagram of exemplary systems for performing automated conversion of vocabulary and narrative tone. As shown in FIG. 1, according to one implementation, content translation system 100a includes computing platform 102a having hardware processor 104a, and system memory 106a implemented as a non-transitory storage device. According to the present exemplary implementation, system memory 106a stores language conversion software code 110a providing user interface (UI) 150a.

As further shown in FIG. 1, computing platform 102a is implemented within a use environment including network 120, content source 108, personal communication device 140 including display 148, and user 124 utilizing personal communication device 140. Also shown in FIG. 1 are network communication links 122 communicatively coupling personal communication device 140 to computing platform 102a via network 120, selection data 130, content 132 obtained from content source 108, and translated content 138 output by language conversion software code 110a.

It is noted that, although the present application refers to language conversion software code 110a as being stored in system memory 106a for conceptual clarity, more generally, system memory 106a may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104a of computing platform 102a, for example. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts language conversion software code 110a as being stored in its entirety in system memory 106a, that representation is also provided as an aid to conceptual clarity. More generally, content translation system 100a may include one or more computing platforms 102a, such as computer servers for example, which may be co-located, or may form an interactively linked but distributed system, such as a cloud based system, for instance.

As a result, hardware processor 104a and system memory 106a may correspond to distributed processor and memory resources within content translation system 100a. Thus, it is to be understood that various portions of language conversion software code 110a, such as one or more of the features described below by reference to FIG. 4, may be stored and/or executed using the distributed memory and/or processor resources of content translation system 100a.

As further shown in FIG. 1, according to another implementation, content translation system 100b includes robotic computing platform 102b in the form of a robot or other type of machine having a human figure. According to that alternative implementation, robotic computing platform 102b includes hardware processor 104b, system memory 106b implemented as a non-transitory storage device, a speaker, a microphone and a display for communications with human users. According to the present exemplary implementation, system memory 106b stores language conversion software code 110b providing UI 150b.

Content translation system 100a/100b provides an automated solution for converting the wording of language-based content expressed in a particular vocabulary to another vocabulary in the same language. For example, in some implementations, hardware processor 104a/104b may execute language conversion software code 110a/110b to convert the wording of language-based content included in content 132 and expressed in a vocabulary intended for an adult audience to a vocabulary including simpler and/or less profane words in the same language that is suitable for a younger, less worldly audience. That is to say, in some implementations, hardware processor 104a/104b may execute language conversion software code 110a/110b to convert the wording of language-based content of content 132 expressed in an adult vocabulary to a teen vocabulary or a children's vocabulary.

Moreover, in some implementations, hardware processor 104a/104b may execute language conversion software code 110a/110b to transform language-based content included in content 132 and expressed using a narrative tone intended for an adult audience to a narrative tone that is suitable for a younger, less worldly audience, and more impressionable audience, before outputting translated content 138. Thus, in some implementations, hardware processor 104a/104b may execute language conversion software code 110a/110b to transform language-based content of content 132 having a tone that is critical, cynical, or pessimistic to content having a tone that is encouraging and/or optimistic.

According to one implementation, as shown in FIG. 1, user 124, who may be a teen or child user, for example, may utilize personal communication device 140 to interact with computing platform 102a via UI 150a and network 120. In one such implementation, computing platform 102a may correspond to one or more web servers, accessible over a packet-switched network such as the Internet, for example. Alternatively, computing platform 102a may correspond to one or more computer servers supporting a local area network (LAN), or included in another type of limited distribution network.

User 124 may utilize personal communication device, 140, UI 150a, and network 120 to submit selection data 130 identifying content 132 of interest to user 124, to content translation system 100a. Hardware processor 104a of computing platform 102a may then execute language conversion software code 110a to obtain content 132 from content source 108, convert the wording of language-based content included in content 132 from one vocabulary to another vocabulary in the same language, and output translated content 138 for consumption by user 124. Furthermore, and as noted above, in some implementations, hardware processor 104a may execute language conversion software code 110a to transform a narrative tone of language-based content included in content 132 to a less critical, cynical, and/or pessimistic narrative tone before outputting translated content 138.

According to another implementation shown in FIG. 1, user 124 may utilize personal communication device 140 to interact with computing platform 102b via network 120 and UI 150b, or may interact directly with computing platform 102b via UI 150b. In one such implementation, as noted above, computing platform 102a may correspond to a robot or other type of machine having a human form. User 124 may utilize personal communication device 140 and network 120, or UI 150b to submit selection data 130 identifying content 132 of interest to user 124, to content translation system 100b. Hardware processor 104b of computing platform 102b may then execute language conversion software code 110b to obtain content 132 from content source 108, convert the wording of language-based content included in content 132 from one vocabulary to another vocabulary in the same language, and output translated content 138. Furthermore, and as also noted above, in some implementations, hardware processor 104b may execute language conversion software code 110b to transform a narrative tone of language-based content included in content 132 to a less critical, cynical, and/or pessimistic narrative tone before outputting translated content 138.

Although personal communication device 140 is shown as a mobile device in the form of a smartphone or tablet computer in FIG. 1, that representation is also provided merely as an example. More generally, personal communication device 140 may be any suitable mobile or stationary computing device or system capable of performing data processing sufficient to provide a user interface, support connections to network 120, and implement the functionality ascribed to personal communication device 140 herein. For example, in other implementations, personal communication device 140 may take the form of a laptop computer or desktop computer, a digital media player, or a gaming console, for example. In one implementation, user 124 may utilize personal communication device 140 to interact with computing platform 102a/102b to use language conversion software code 110a/110b, executed by respective hardware processor 104a/104b, to generate translated content 138 based on content 132.

It is noted that, in various implementations, translated content 138, when generated using language conversion software code 110a/110b, may be stored in system memory 106a/106b and/or may be copied to non-volatile storage. Alternatively, or in addition, as shown in FIG. 1, translated content 138 may be sent to personal communication device 140 for rendering on display 148, for example by being transferred via network communication links 122 of network 120. It is further noted that display 148 may be implemented as a liquid crystal display (LCD), a light-emitting diode (LED) display, an organic light-emitting diode (OLED) display, or any other suitable display screen that performs a physical transformation of signals to light.

Figure 2:
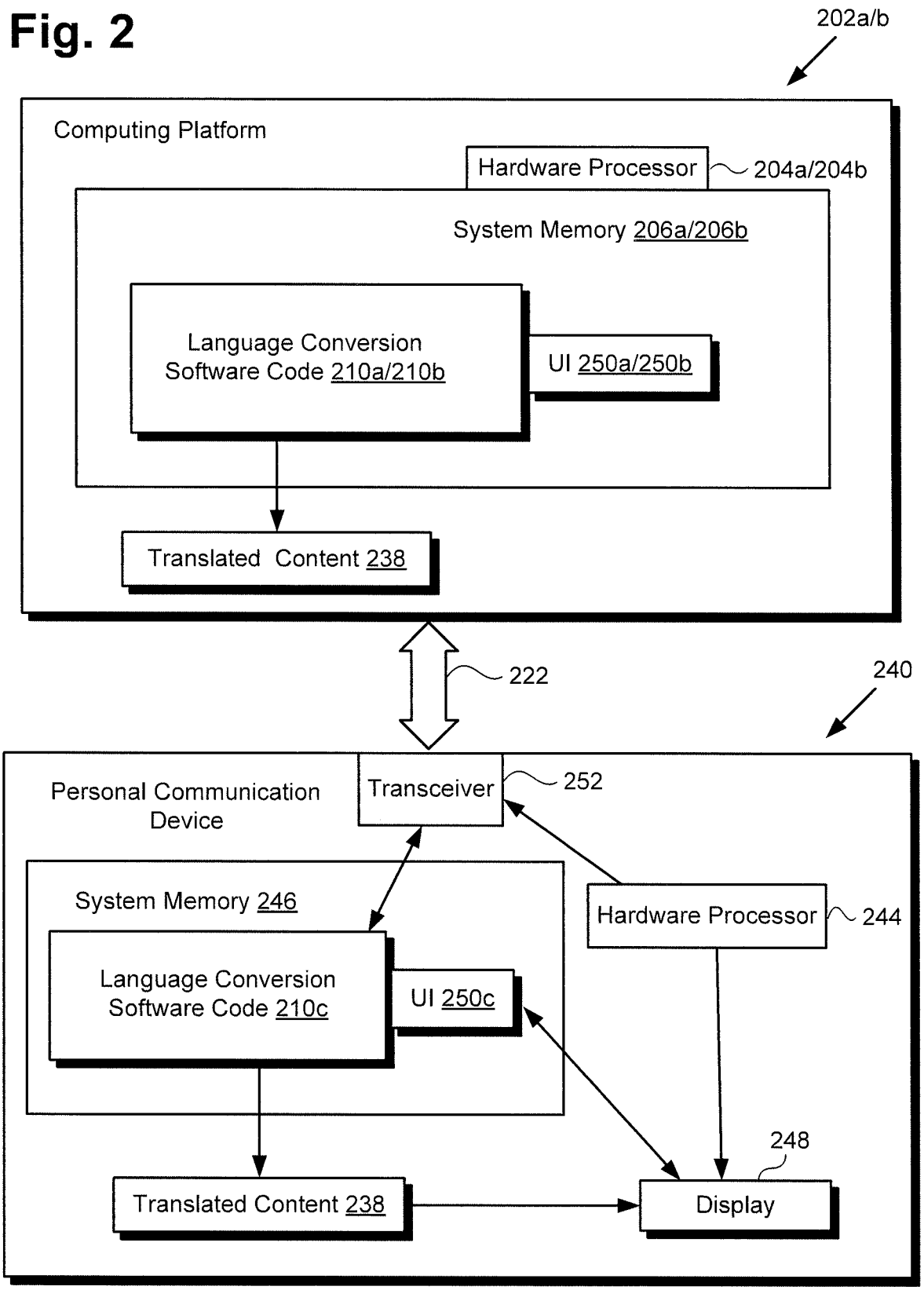
FIG. 2 shows a more detailed exemplary representation of a personal communication device suitable for use in performing automated conversion of vocabulary and narrative tone, in combination with the computing platforms shown in FIG. 1.

FIG. 2 shows a more detailed representation of exemplary personal communication device 240 in combination with computing platform 202a implemented as a computer server or computing platform 202b implemented as a robot or other machine having a human form. As shown in FIG. 2, personal communication device 240 is communicatively coupled to computing platform 202a/202b over network communication link 222. Computing platform 202a/202b includes hardware processor 204a/204b, system memory 206a/206b, and language conversion software code 210a/210b providing UI 250a/250b.

As further shown in FIG. 2, personal communication device 240 includes hardware processor 244, memory 246 implemented as a non-transitory storage device storing language conversion software code 210c, and UI 250c provided by language conversion software code 210c. As also shown in FIG. 2, personal communication device 240 includes transceiver 252, and display 248 receiving translated content 238 for rendering on display 248.

Network communication link 222 and computing platform 202a/202b having hardware processor 204a/204b and system memory 206a/206b, correspond respectively in general to network communication link 122 and computing platform 102a/102b having hardware processor 104a/104b and system memory 106a/106b, in FIG. 1. In addition, language conversion software code 210a/210b, and UI 250a/250b, in FIG. 2, correspond respectively in general to language conversion software code 110a/110b, and UI 150a/150b in FIG. 1. In other words, language conversion software code 210a/210b and UI 250a/250b may share any of the characteristics attributed to corresponding language conversion software code 110a/110b and UI 150a/150b by the present disclosure, and vice versa. It is also noted that translated content 238, in FIG. 2, corresponds in general to translated content 138, in FIG. 1.

Personal communication device 240 and display 248 correspond in general to personal communication device 140 and display 148, in FIG. 1, and those corresponding features may share any of the characteristics attributed to either corresponding feature by the present disclosure. Thus, like personal communication device 140, personal communication device 240 may take the form of a smartphone, tablet, laptop, or desktop computer, a digital media player, or a gaming console. In addition, and although not shown in FIG. 1, personal communication device 140 may include features corresponding to hardware processor 244, transceiver 252, memory 246 storing language conversion software code 210c, and UI 250c provided by language conversion software code 210c. Moreover, like display 148, display 248 may be implemented as an LCD, an LED display, an OLED display, or any other suitable display screen that performs a physical transformation of signals to light.

With respect to language conversion software code 210c, it is noted that in some implementations, language conversion software code 210c may be an application providing UI 250c for exchanging data, such as data corresponding to selection data 130 and translated content 138/238 with computing platform 102a/102b/202a/202b. However, in other implementations, language conversion software code 210c may include all of the features of language conversion software code 110a/110b/210a/210b, and may be capable of executing all of the same functionality. That is to say, in some implementations, language conversion software code 210c corresponds to language conversion software code 110a/110b/210a/210b and may share any of the characteristics attributed to those corresponding features by the present disclosure.

According to the exemplary implementation shown in FIG. 2, language conversion software code 210c is located in memory 246, having been received via network communication link 122/222, either from computing platform 102a/202a or an authorized third party source of language conversion software code 210c. In one implementation, network communication link 122/222 corresponds to transfer of language conversion software code 210c over a packet-switched network, for example. Once transferred, for instance by being downloaded over network communication link 122/222, language conversion software code 210c may be persistently stored in memory 246, and language conversion software code 210c may be executed on personal communication device 140/240 by hardware processor 244.

Hardware processor 244 may be the central processing unit (CPU) for personal communication device 140/240, for example, in which role hardware processor 244 runs the operating system for personal communication device 140/240 and executes language conversion software code 210c. As noted above, in some implementations, personal communication device 140/240 can utilize language conversion software code 210c as a user interface with computing platform 102a/102b/202a/202b for providing selection data 130 to language conversion software code 110a/110b/210a/210b, and for receiving translated content 138/238 from language conversion software code 110a/110b/210a/210b.

However, in other implementations, personal communication device 140/240 can utilize language conversion software code 210c to interact with content source 108, via network 120, to obtain content 132. In those latter implementations, language conversion software code 210c may further convert the wording of language-based content included in content 132 and expressed in a first vocabulary to a second vocabulary in the same language as the first vocabulary. Furthermore, in those implementations, hardware processor 244 may execute language conversion software code 210c to output translated content 138/238 for rendering on display 148/248. In addition, in some implementations, hardware processor 244 may execute language conversion software code 210c to transform language-based content included in content 132 and expressed using a first narrative tone to a second narrative tone before outputting translated content 138/238. Thus, in some implementations, personal communication device 140/240 serves as the computing platform for performing automated conversion of vocabulary and/or narrative tone.

Figure 3:
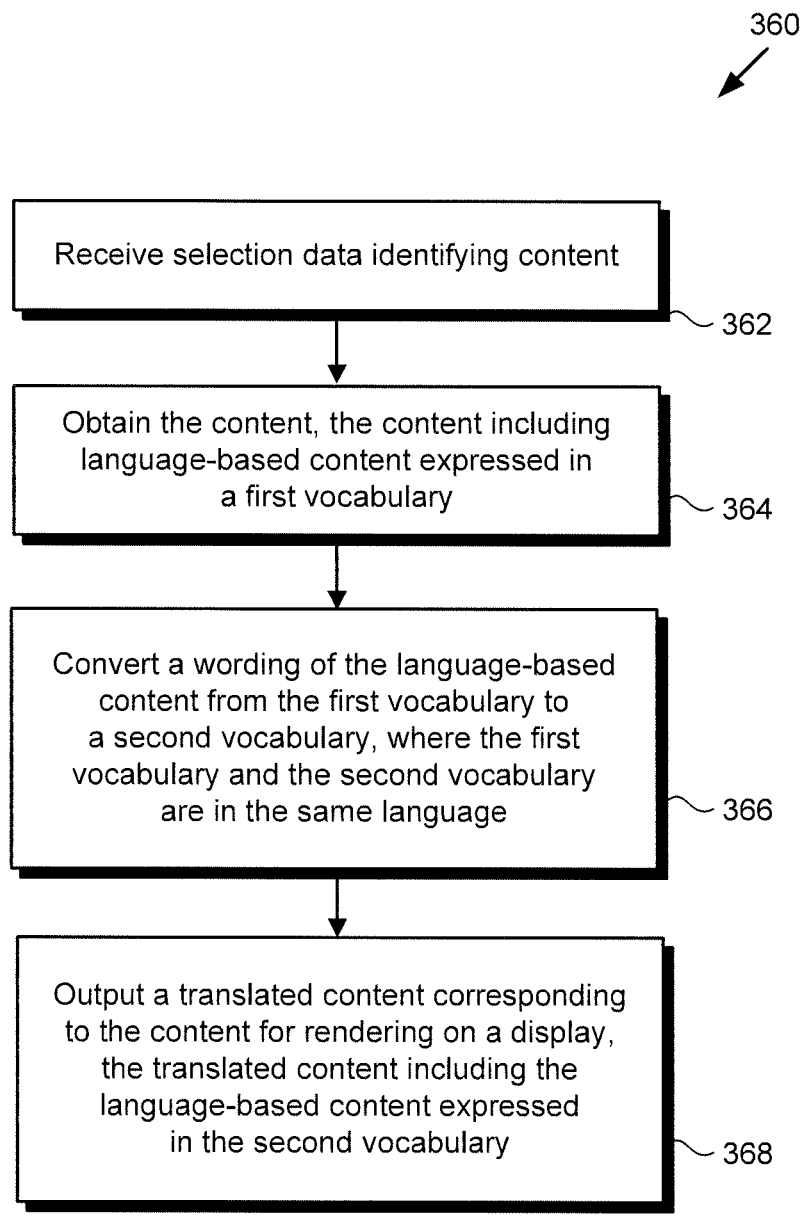
FIG. 3 shows a flowchart presenting an exemplary method for performing automated conversion of vocabulary, according to one implementation.

The functionality of language conversion software code 110a/110b/210a/210b/210c will be further described by reference to FIG. 3 in combination with FIGS. 1, 2, and 4. FIG. 3 shows flowchart 360 presenting an exemplary method for use by a system, such as content translation system 100a/100b, in FIG. 1, or personal communication device 140/240, in FIGS. 1 and 2, to perform automated conversion of vocabulary. With respect to the method outlined in FIG. 3, it is noted that certain details and features have been left out of flowchart 360 in order not to obscure the discussion of the inventive features in the present application.

Figure 4:
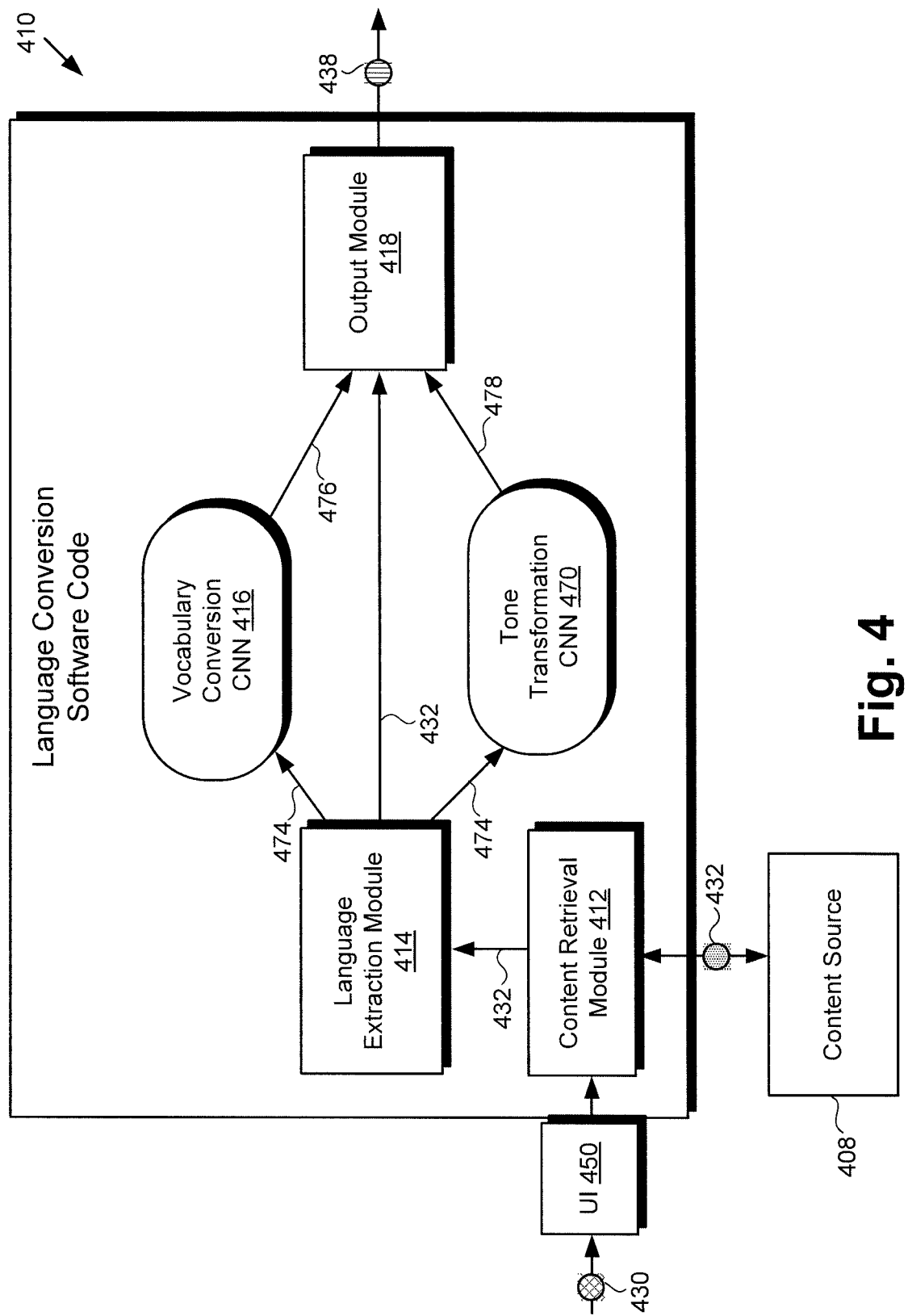
FIG. 4 shows an exemplary diagram of a language conversion software code including a vocabulary conversion convolutional neural network (CNN) that is suitable for use by the systems shown by FIGS. 1 and 2, according to one implementation.

FIG. 4 shows exemplary language conversion software code 410 suitable for execution by hardware processor 104a/104b/204a/204b/244 of the systems shown by FIGS. 1 and 2, according to one implementation. As shown in FIG. 4, language conversion software code 410 may include content retrieval module 412, language extraction module 414, vocabulary conversion CNN 416, optional tone transformation CNN 470, and output module 418, for example. In addition FIG. 4 includes UI 450 provided by language conversion software code 410, selection data 430, content 432 obtained from content source 408, and translated content 438. Also shown in FIG. 4 are language-based content 474 expressed in a first vocabulary and using a first tone, converted language-based content 476 in a second vocabulary, and optional transformed language-based content 478 using a second tone.

Selection data 430, content 432, and content source 408 correspond respectively in general to selection data 130, content 132, and content source 108, in FIG. 1, and may share any of the characteristics attributed to those corresponding features by the present disclosure. Moreover, language conversion software code 410, UI 450, and translated content 438 correspond respectively in general to language conversion software code 110a/110b/210a/210b/210c, UI 150a/150b/250a/250b/250c, and translated content 138/238, in FIGS. 1 and 2. That is to say, language conversion software code 410, UI 450, and translated content 438 may share any of the characteristics attributed to respective language conversion software code 110a/110b/210a/210b/210c, UI 150a/150b/250a/250b/250c, and translated content 138/238 by the present disclosure, and vice versa. Thus, like language conversion software code 410, language conversion software code 110a/110b/210a/210b/210c may include modules corresponding to exemplary content retrieval module 412, language extraction module 414, vocabulary conversion CNN 416, optional tone transformation CNN 470, and output module 418.

Referring now to FIG. 3 in combination with FIGS. 1, 2, and 4, flowchart 360 begins with receiving selection data 130/430 identifying content 132/432 (action 362). By way of example, UI 150a/150b/250a/250b/250c/450 of language conversion software code 110/210a/210b/210c/410 may display a menu of content available from content source 108/408 to user 124 via display 148/248. User 124 may then provide inputs to personal communication device 140/240, via UI 150a/150b/250a/250b/250c/450 identifying one or more items of content 132/432 that user 124 desires to read, view, or otherwise consume.

As shown by FIG. 1, in one implementation, selection data 130/430 may be transmitted by personal communication device 140/240, using transceiver 252, to computing platform 102a/102b/202a/202b via network 120 and network communication links 122/222. In those implementations, selection data 130/430 may be received by language conversion software code 110a/110b/210a/210b/410, executed by hardware processor 104a/104b/204a/204b of computing platform 102a/102b/202a/202b, via UI 150a/150b/250a/250b/450.

In another implementation, user 124 may interact directly with computing platform 102b/202b via UI 150b/205b. In those implementations, selection data 130/430 may be received by language conversion software code 110b/210b, executed by hardware processor 104b/204b of computing platform 102b/202b. However, in yet other implementations, selection data 130/430 may be received from UI 250b/450 by language conversion software code 210c/410, executed by hardware processor 244 of personal communication device 140/240.

Flowchart 360 continues with obtaining content 132/432, where content 132/432 includes language-based content 474 expressed in a first vocabulary (action 364). Content 132/432 may include a wide variety of different content types. For example, content 132/432 may include one or more of literary content, news content, music content, sports content, movie content, television (TV) programming content, and gaming content, to name a few examples. Content 132/432 may be obtained from content source 108/408, which may be a content aggregator providing presently trending content, and may further include a content library offering archived content.

In implementations in which content 132/432 includes content from a digital book, newspaper, newsletter, or magazine, for example, content 132/432 and language-based content 474 may be substantially the same. However, in implementations in which content 132/432 includes audio-visual content, such as movie or TV programming content, or a music video, for example, language-based content 474 may take the form of a written transcript of the dialog or lyrics included in content 132/432.

As discussed above, content 132/432 including language-based content 474 may be content developed and intended for a mature adult audience. As a result, the vocabulary used to express the wording of language-based content 474 may include technical or otherwise elevated terminology, sophisticated metaphors and/or similes, and in some instances, sexual innuendo, vulgarity, or profanity. Thus, in implementations in which user 124 is a teen or child, language-based content 474 may be expressed in a vocabulary that is unsuitable for user 124 or makes content 132/432 difficult for user 124 to understand and enjoy.

In implementations in which selection data 130/430 is received by computing platform 102a/102b/202a/202b of content translation system 100a/100b, content 132/432 may be obtained from content source 108/408 by language conversion software code 110a/110b/210a/210b/410, executed by hardware processor 104a/104b/204a/204b, and using content retrieval module 412. Moreover, in implementations in which content 132/432 includes mixed content, such as audio-visual content, or text accompanied by pictures or graphs, language-based content 474 may be extracted from content 132/432 by language conversion software code 110a/110b/210a/210b, executed by hardware processor 104a/104b/204a/204b, and using language extraction module 414.

However, as noted above, in some implementations, selection data 130/430 is received by language conversion software code 210c stored in memory 246 of personal communication device 140/240. In those implementations, content 132/432 may be obtained from content source 108/408 by language conversion software code 210c/410, executed by hardware processor 244 of personal computing device 140/240, and using transceiver 252 as well as content retrieval module 412. Moreover, in implementations in which content 132/432 includes mixed content, such as audio-visual content, or text accompanied by pictures or graphs, language-based content 474 may be extracted from content 132/432 by language conversion software code 210c/410, executed by hardware processor 244 of personal computing device 140/240, and using language extraction module 414.

Flowchart 360 continues with converting the wording of language-based content 474 from the first vocabulary to a second vocabulary, where the first vocabulary and the second vocabulary are in the same language (action 366). That is to say, action 366 may include converting the wording of language-based content 474 from a first vocabulary in English to a second vocabulary in English, or from a first vocabulary in Spanish, Mandarin Chinese, or any other language to a second vocabulary in that same language.

As noted above, the wording of language-based content 474 expressed in a vocabulary intended for an adult audience may be converted to "converted language-based content 476" expressed in a vocabulary including simpler and/or less vulgar or profane words in the same language. Thus, in some implementations, the wording of language-based content 474 included in content 132/432 and expressed in an adult vocabulary may be converted to a teen vocabulary or to a children's vocabulary.

With respect to the term "vocabulary," as used herein, "vocabulary" may refer to a collection of phrases, which may include sentence fragments or entire sentences, as well as to a collection of individual words. Thus, converting a wording of language-based content from a first vocabulary to a second vocabulary, as described herein, may refer to converting a word or a phrase in the first vocabulary to a word or a phrase in the second vocabulary. As a specific example, language-based literary content expressed for an adult audience and describing "the relentless sun high in the bright azure sky" may be converted to "the sun shone brightly in the blue sky" for a children's or teen audience.

As another specific example of converting wording, language-based news content expressed for an adult audience and describing "the interrogatory further infuriated the witness" may be converted to "the questions made the witness angry" for a children's or teen audience. As yet another example, language-based content expressed for an adult audience and describing "a river alive with batrachian movement" may be converted to "a river with many frogs" for a children's or teen audience. As another specific example, language-based expression for a teen audience may be "his pal is a cool dude," which may be converted to "his friend is a nice person" for an adult audience.

In implementations in which content 132/432 is obtained by computing platform 102a/102b/202a/202b of content translation system 100a/100b, conversion of language-based content 474 to converted language-based content 476 may be performed by language conversion software code 110a/110b/210a/210b/410, executed by hardware processor 104a/104b/204a/204b, and using vocabulary conversion CNN 416. However, in implementations in which content 132/432 is obtained by personal communication device 140/240, conversion of language-based content 474 to converted language-based content 476 may be performed by language conversion software code 210c/410, executed by hardware processor 244, and using vocabulary conversion CNN 416.

By way of example, vocabulary conversion CNN 416 may be trained using corresponding entries from a college level dictionary and a teen or children's dictionary. Those entries may be fed to vocabulary conversion CNN 416, which filters the content as n-grams to learn the corresponding word embeddings, and map the associated words and phrases in vector space. The vector space may correspond to a map of vocabulary that is typically used and/or understood by particular target audience age groups. Words or phrases that overlap or are closely located in the vector space can be predicted to be of the same conversational vocabulary. This vector mapping forms the predictive model that can be used to translate language-based content 474 to converted language-based content 476 suitable for enjoyment by user 124.

Thus, in some implementations, vocabulary conversion CNN 416 may be configured to convert a word or phase in the vocabulary of language-based content 474 into the vocabulary of converted language-based content 476 using an n-dimensional vector space mapping. For example, vocabulary conversion CNN 416 may be configured to generate a vector corresponding to the word or phrase in the vocabulary of language-based content 474, map the vector to a projection in an n-dimensional vector space corresponding the vocabulary of converted language-based content 476, and convert the word or phrase from the vocabulary of language-based content 474 to the vocabulary of converted language-based content 476 based on the projection.

In some implementation, flowchart 360 can conclude with outputting translated content 138/238/438 corresponding to content 132/432 for rendering on display 148/248, where translated content 138/238/438 includes converted language-based content 476 (action 368). In implementations in which conversion of language-based content 474 to converted language-based content 476 is performed by language conversion software code 110a/110b/210a/210b/410, language conversion software code 110a/110b/210a/210b/410 may be further executed by hardware processor 104a/104b/204a/204b of computing platform 102a/202 to output translated content 138/238/438. For example, language conversion software code 110a/110b/210a/210b/410 may utilize output module 418 to transmit translated content 138/238/438 to personal communication device 140/240 via network 120 and network communication links 122/222.

However, in implementations in which conversion of language-based content 474 to converted language-based content 476 is performed by language conversion software code 210c/410, language conversion software code 210c/410 may output translated content 138/238/438 by rendering translated content 138/238/438 on display 148/248.

Although not included in the outline provided by flowchart 360, in some implementations, the present method my further include transforming a narrative tone of content 132/432, for example, from a narrative tone intended for an adult audience to a narrative tone that is suitable for a younger, less worldly audience, and more impressionable audience, before outputting translated content 138/238. That is to say, in some implementations, hardware processor 104a/104b/204a/204b may execute language conversion software code 110a/110b/210a/210b/410 to utilize tone transformation CNN 470 to transform language-based content 474 having a tone that is critical, cynical, or pessimistic to transformed language-based content 478 having a tone that is encouraging and/or optimistic.

Alternatively, hardware processor 244 may execute language conversion software code 210c/410 to utilize tone transformation CNN 470 to transform language-based content 474 having a tone that is critical, cynical, or pessimistic to transformed language-based content 478 having a tone that is encouraging and/or optimistic. It is noted that when included as a feature of language conversion software code 110a/110b/210a/210b/210c/410, tone transformation CNN 470 may be trained in a manner analogous to vocabulary conversion CNN 416, as described above.

Thus, the present application is directed systems and methods for performing automated conversion of vocabulary and/or narrative tone. As described above, in some implementations, the automated solutions disclosed in the present application utilize a vocabulary conversion CNN to convert the wording of language-based content expressed in a first vocabulary suitable for an adult audience to a second vocabulary in the same language that is a teen or children's vocabulary. In addition, the present automated solution may include a tone transformation CNN for transforming a narrative tone of language-based content intended for an adult audience to a narrative tone that is more optimistic and/or encouraging for an audience of teens or children.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content translation system comprising:
a computing platform including a hardware processor and a system memory;
a language conversion software code stored in the system memory, the language conversion software code including a vocabulary conversion convolutional neural network (CNN);
the hardware processor configured to execute the language conversion software code to:
obtain a content including a language-based content expressed in a first vocabulary;
convert, using the vocabulary conversion CNN, a wording of the language-based content from the first vocabulary to a second vocabulary, wherein the first vocabulary and the second vocabulary are in a same language, wherein the second vocabulary is one of a teen vocabulary or a children vocabulary, and wherein to convert the wording, the vocabulary conversion CNN is configured to:
generate a vector corresponding to one of a word or a phrase in the first vocabulary;
map the vector to a projection in a vector space corresponding to the second vocabulary; and
convert the one of the word or the phrase in the first vocabulary to one of a word or a phrase in the second vocabulary based on the projection;
output a translated content corresponding to the converted wording for rendering on a display, the translated content including the language-based content expressed in the second vocabulary.

2. The content translation system of claim 1, further comprising the display, wherein the hardware processor is further configured to execute the language conversion software code to render the translated content on the display.

3. The content translation system of claim 1, wherein the second vocabulary includes simpler words than the first vocabulary.

4. The content translation system of claim 1, wherein the language-based content is expressed using a first tone, and wherein the hardware processor is further configured to execute the language conversion software code to transform the first tone to a second tone before the translated content is output.

5. The content translation system of claim 4, wherein the first tone is at least one of critical or pessimistic, and wherein the second tone is at least one of encouraging or optimistic.

6. The content translation system of claim 4, wherein the language conversion software code includes a tone transformation CNN configured to convert the first tone to the second tone.

7. A method for use by a content translation system including a computing platform having a hardware processor and a system memory storing a language conversion software code including a vocabulary conversion convolutional neural network (CNN), the method comprising:
obtaining, using the hardware processor, a content including a language-based content expressed in a first vocabulary;
converting, using the hardware processor and the vocabulary conversion CNN, a wording of the language-based content from the first vocabulary to a second vocabulary, wherein the first vocabulary and the second vocabulary are in a same language, wherein the second vocabulary is one of a teen vocabulary or a children vocabulary, and wherein the converting includes:
generating a vector corresponding to one of a word or a phrase in the first vocabulary;
mapping the vector to a projection in a vector space corresponding to the second vocabulary; and
converting the one of the word or the phrase in the first vocabulary to one of a word or a phrase in the second vocabulary based on the projection;
outputting, using the hardware processor, a translated content corresponding to the converted wording for rendering on a display, the translated content including the language-based content expressed in the second vocabulary.

8. The method of claim 7, wherein the content translation system further comprises the display, the method further comprises rendering, using the hardware processor, the translated content on the display.

9. The method of claim 7, wherein the second vocabulary includes simpler words than the first vocabulary.

10. The method of claim 7, wherein the language-based content is expressed using a first tone, and wherein the method further comprises transforming, using the hardware processor, the first tone to a second tone before the translated content is output.

11. The method of claim 10, wherein the first tone is at least one of critical or pessimistic, and wherein the second tone is at least one of encouraging or optimistic.

12. The method of claim 10, wherein the language conversion software code includes a tone transformation CNN, and wherein the language conversion software code uses the tone transformation CNN to convert the first tone to the second tone.

13. A computer-readable non-transitory medium having stored thereon a language conversion software code including a vocabulary conversion convolutional neural network (CNN) and instructions, which when executed by a hardware processor, instantiate a method comprising:
obtaining a content including a language-based content expressed in a first vocabulary;
converting, using the vocabulary conversion CNN, a wording of the language-based content from the first vocabulary to a second vocabulary, wherein the second vocabulary is one of a teen vocabulary or a children vocabulary, and wherein the first vocabulary and the second vocabulary are in a same language, wherein the converting includes:
generating a vector corresponding to one of a word or a phrase in the first vocabulary;

mapping the vector to a projection in a vector space corresponding to the second vocabulary; and converting the one of the word or the phrase in the first vocabulary to one of a word or a phrase in the second vocabulary based on the projection;

outputting a translated content corresponding to the converted wording for rendering on a display, the translated content including the language-based content expressed in the second vocabulary.

14. The computer-readable non-transitory medium of claim 13, wherein the language-based content is expressed using a first tone, and wherein the method further comprises transforming the first tone to a second tone before the translated content is output, and wherein the language conversion software code includes a tone transformation CNN configured to convert the first tone to the second tone.

15. The content translation system of claim 1, wherein the computing platform comprises a robot.

16. The content translation system of claim 1, wherein the content including the language-based content expressed in the first vocabulary comprises at least one of audio-visual content or music, and wherein the second vocabulary includes simpler words than the first vocabulary.

17. The method of claim 7, wherein the computing platform of the content translation system comprises a robot.

18. The method of claim 7, wherein the content including the language-based content expressed in the first vocabulary comprises at least one of audio-visual content or music, and wherein the second vocabulary includes simpler words than the first vocabulary.

19. The computer-readable non-transitory medium of claim 13, wherein the content including the language-based content expressed in the first vocabulary comprises at least one of audio-visual content or music, and wherein the second vocabulary includes simpler words than the first vocabulary.

* * * * *